Nov. 30, 1926.

C. W. STEELE 1,609,004

MACHINE FOR CUTTING RUBBER

Filed Feb. 8, 1926    4 Sheets-Sheet 1

Inventor
Charles W Steele
By
His Attorneys

Nov. 30, 1926.

C. W. STEELE 1,609,004

MACHINE FOR CUTTING RUBBER

Filed Feb. 8, 1926 4 Sheets-Sheet 3

Inventor
Charles W. Steele
By
his Attorneys

Nov. 30, 1926.

C. W. STEELE 1,609,004

MACHINE FOR CUTTING RUBBER

Filed Feb. 8, 1926     4 Sheets-Sheet 4

Inventor
Charles W. Steele
By *Speer Middleton Donaldson Hall*
his Attorneys

Patented Nov. 30, 1926.

1,609,004

UNITED STATES PATENT OFFICE.

CHARLES W. STEELE, OF AKRON, OHIO, ASSIGNOR TO THE MILLER RUBBER COMPANY, OF AKRON, OHIO, A CORPORATION OF OHIO.

MACHINE FOR CUTTING RUBBER.

Application filed February 8, 1926. Serial No. 86,833.

My present invention relates to improvements in machines for cutting sheet rubber into blanks suitable for making articles of rubber such for example as rubber footwear.

In the manufacture of such articles, it is necessary to cut blanks of a considerable number of sizes or shapes, and heretofore, so far as I am aware, no machine has been available which is capable of being quickly changed to cut different blanks according to the requirements of the operators. As a single cutting machine is capable of supplying a large number of assemblies, either a number of cutting machines were required, some or all of which might be idle through considerable periods of time, or the cutting dies would have to be changed, which has heretofore been a tedious and laborious operation.

The present invention aims to provide a cutting machine capable of carrying a plurality of cutters of different sizes or styles, any one of which may be readily brought into operative position without loss of time and without the necessity of stopping the machinery.

With these and other objects in view, the invention includes the novel features of construction and arrangement and combination of parts hereinafter described, the said invention being defined and ascertained by the claims appended hereto.

What I at present consider the preferred embodiment of my invention is illustrated in the accompanying drawings, in which:—

Figure 1:
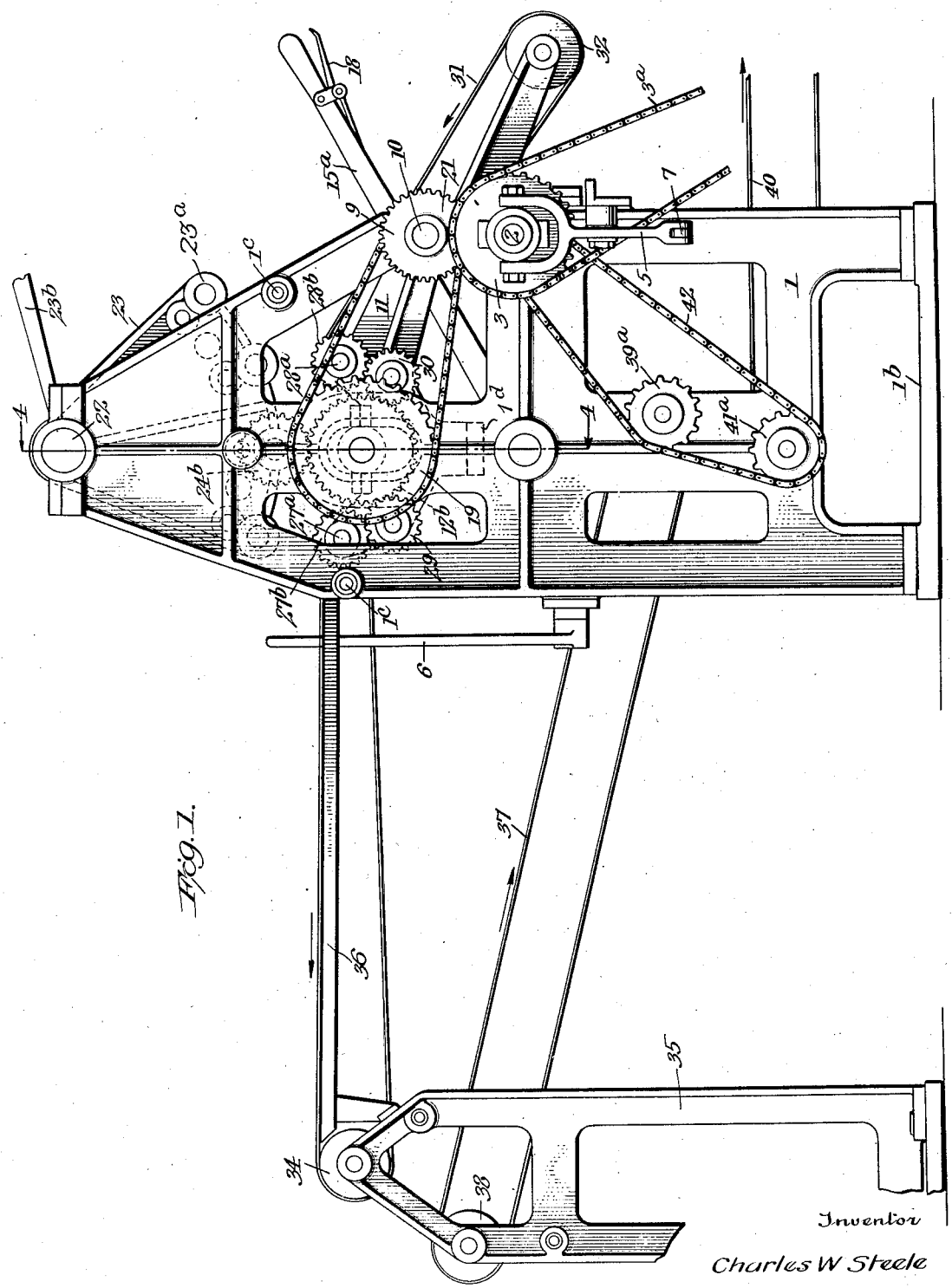
Figure 1 is a side elevation of a cutting machine.
Figure 2:
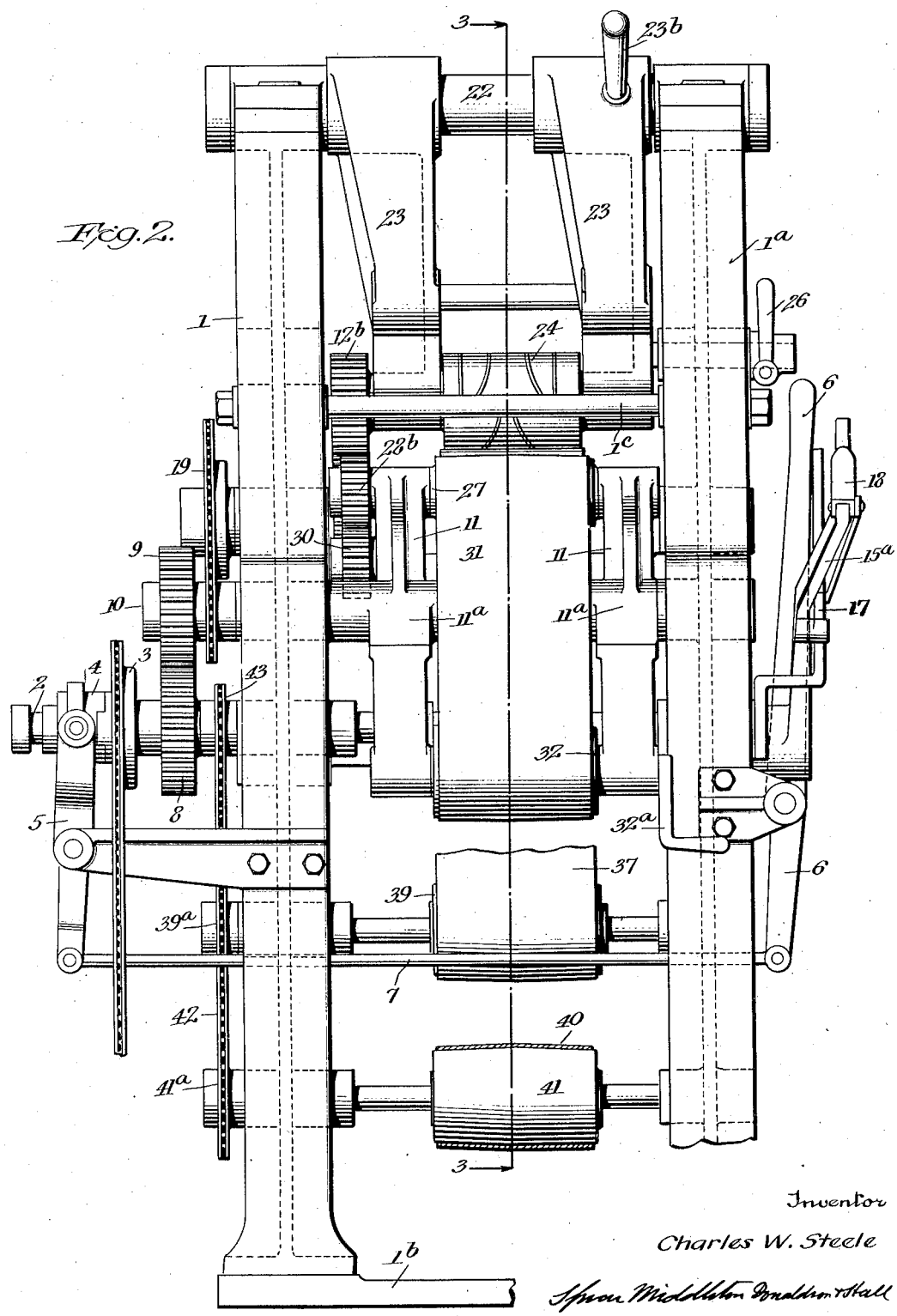
Fig. 2 is an end elevation as viewed from the right of Fig. 1.

Referring by reference characters to these drawings, the numerals 1 and 1$^a$ designate side frame members supported by a suitable base 1$^b$ and tied together by cross bars or members 1$^c$.

Journaled in suitable bearings in the frame members is a shaft 2 designed to be driven from any suitable source of power or prime mover (not shown) by any convenient means, as for example, a sprocket chain passing over sprocket wheel 3. Sprocket wheel 3 is loose on the shaft and adapted to be connected thereto by a clutch member 4 splined on the shaft and operated by shifter fork 5 from hand lever 6 located at a point convenient to the operator through the intermediary of the connecting rod 7.

Fast to the hub of sprocket wheel 3 is a gear 8 which meshes with a gear 9 fast on a shaft 10 journaled in suitable bearings in the frame above the shaft 2.

Articulated on shaft 10 is a swinging frame 11 having at one end a sleeve 11$^a$ through which the shaft 10 passes, and having suitable bearings 11$^b$ in which is journaled the shaft 12$^a$ of the platen roll 12, against which the die cutters act in the manner hereinafter described. Said platen roll is preferably formed in the shape of a relatively soft core having a smooth hardened cylindrical surface or shell.

The frame has a downwardly projecting portion 11$^c$ provided with wear plates $a$ which coact with cams 13 fast on a rock shaft 14 journaled in bearings in the main frame, and adapted to be oscillated by a hand lever 15 provided with a suitable handle 15$^a$. Hand lever 15 has articulated thereto a pawl 16 which cooperates with a quadrant 17, the pawl being controlled by a finger lever 18 articulated on the hand lever 15 adjacent the handle thereof. It being understood that the cutting roll is held rigidly in working position above the platen roll in the manner hereinafter described, it will be seen that by the rotation of the shaft through the intermediary of the hand lever 15, the cams 13 will cause the free end of the swinging frame 11 to move up or down, thereby either pressing the platen roll against the cutting roll with the requisite force or lowering it completely away from the cutting roll, as desired.

The main frame members are provided with elongated openings 1$^d$ through which the platen roll shaft projects. The platen roll shaft 12$^a$ is designed to be driven from the shaft 10 conveniently by means of a sprocket chain 19 passing around sprocket wheels 20 and 21 fast respectively to the shafts 12$^a$ and 10, so that the platen roll may be driven positively, irrespective of its degree of elevation.

Figure 3:
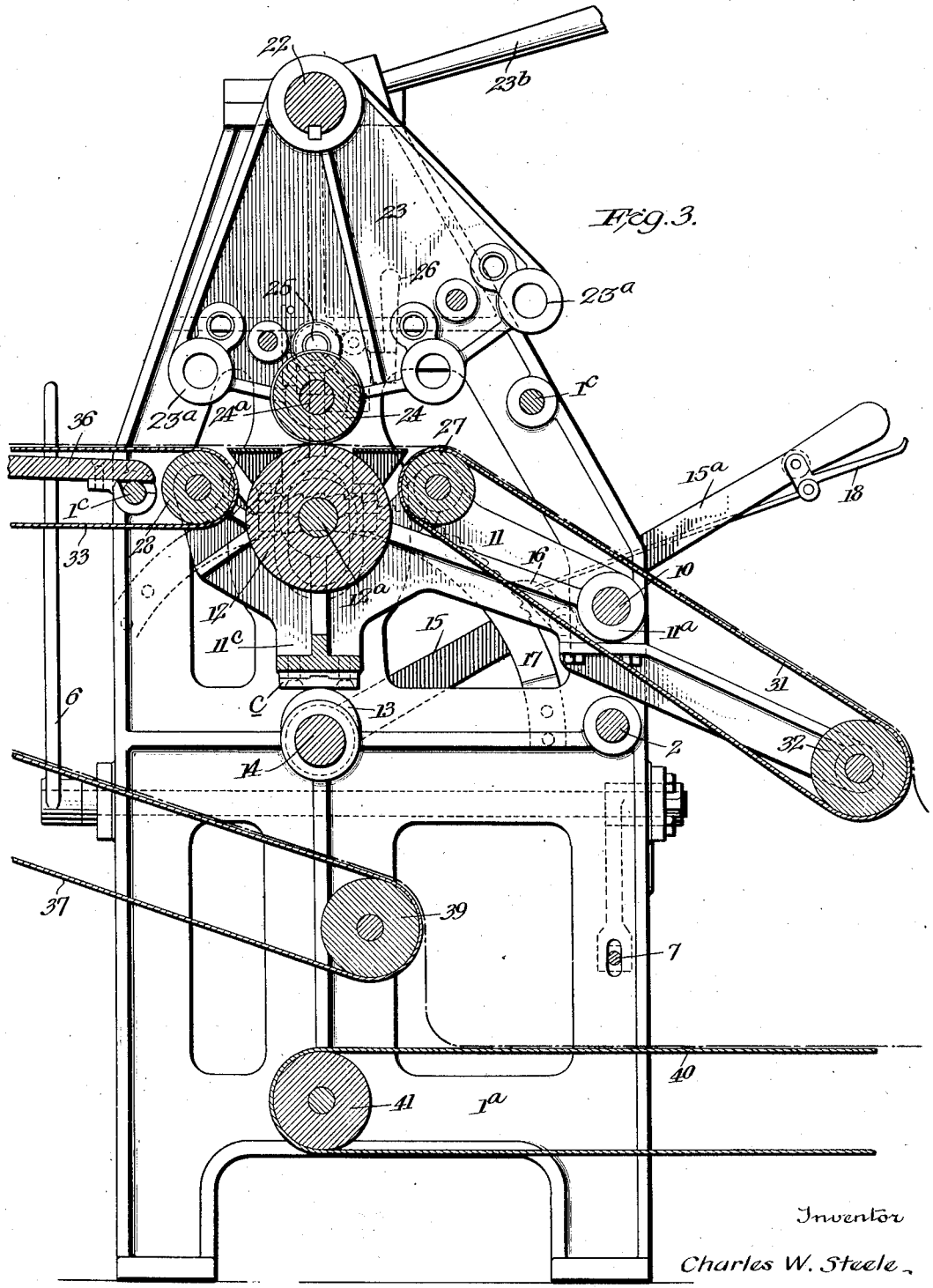
Fig. 3 is a section on line 3—3 of Fig. 2.
Figure 4:
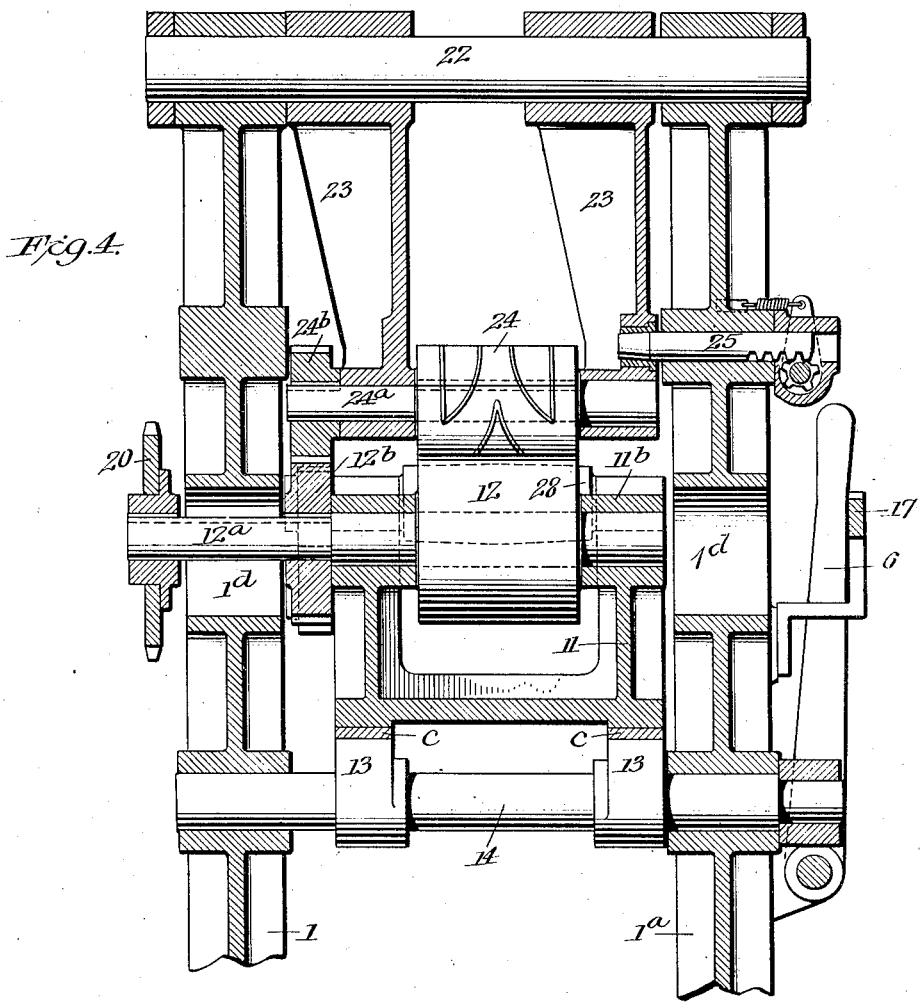
Fig. 4 is a section on line 4—4 of Fig. 1.

Journaled in suitable bearings in the top of the frame, and vertically above the platen roll, is a shaft 22 which carries what I may term a turret frame 23, which may be in the form of a sector, as shown in Fig. 3, or any enlargement thereof up to a complete circle, depending on the number of cutting rolls which it is desired to provide. This turret is provided with bearings 23ª in which are journaled the shafts 24ª of the cutting rolls 24 (only one of which is shown for convenience of illustration), which are arranged equidistantly from the axis of the shaft 22. These cutting rolls are provided on their surface with cutting knives arranged to cut blanks, each of the desired size and configuration, and manifestly, as different sizes of blanks occupy a greater roll surface area, the rolls would be of different size.

Each cutting roll shaft has fast thereon a gear 24ᵇ which meshes with a gear 12ᵇ fast on the platen roll shaft, the gears being of such ratio that the platen and cutting rolls are driven at the same surface speed.

The turret 23 is provided with a suitable handle 23ᵇ by which it may be rocked, and obviously when the platen roll has been lowered as hereinbefore described, the turret may be rotated to bring any one of the cutting rolls into position directly above the platen roll, in which position it may be locked by a locking bolt 25 operated by a hand lever 26, the locking bolt being slidably mounted in a guide opening in the frame and adapted to project into locking recesses in the turret. After any particular cutting roll has thus been brought into position directly above the platen roll, the latter may be forced up with the requisite degree of pressure by downward movement of the lever 15 and held in such position by the pawl 16 engaging the quadrant 17.

The stock may be fed to and from the platen roll in any suitable manner, but I prefer to accomplish this as follows.

On opposite sides of the platen roll shaft and spaced therefrom are located rollers 27 and 28, the shafts 27ª and 28ª of which are journaled in suitable bearings in the platen roll carrying frame 11 and carry pinions 27ᵇ and 28ᵇ. These pinions mesh with idle pinions 29 and 30 respectively, which in turn mesh with gear 12ᵇ fast on the platen roll shaft, whereby said rolls are driven from the platen roll shaft and in the same direction.

Figure 5:
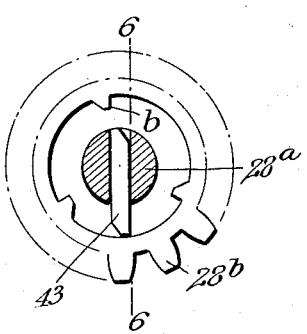
Fig. 5 is a detail view.
Figure 6:
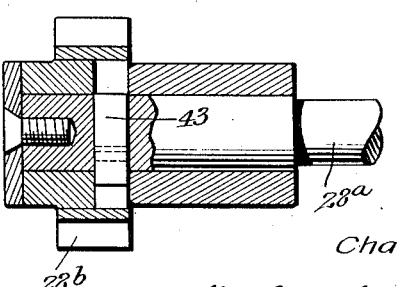
Fig. 6 is a section on line 6—6 of Fig. 5.

A stock sheet belt 31 passes around the roller 27 and around an idle roller 32 journaled in brackets projecting from the main frame, the shaft of roll 32 being provided with a handle 32ª by which it may be rotated by hand if desired in starting the feed. To enable this to be accomplished, pinion 28ᵇ is made loose on its shaft 28ª and connected thereto by a pawl and ratchet connection, conveniently by internal ratchet teeth b cooperating with a gravity actuated pawl 43 (Figs. 5 and 6).

A stock conveyor belt 33 passes around the roll 28 and also around an idle roll 34 which may be supported by an auxiliary frame 35, a table 36 being provided adjacent the stock belt 33 to enable the operator to conveniently remove the cut blanks from the moving sheet. The remaining portion of the sheet, or scrap, drops down onto a stock conveyor belt 37 passing over idle roll 38 and driven roll 39, whereupon the stock is delivered to a conveyor belt 40 passing around the roller 41 and an idle roller (not shown) which may be located in proximity to the calender from which the sheet is delivered, or at any suitable point.

The shafts of rollers 39 and 41 are provided with sprocket wheels 39ª and 41ª respectively, which are driven by a sprocket chain 42 from sprocket 43 fast on the shaft 2.

Having thus described my invention, what I claim is:—

1. In a cutting machine of the class described, a platen roll, a carrier carrying a plurality of cutting rolls, means for moving said carrier to bring any one of said cutting rolls into operative relation to said platen roll, driving means for said platen roll, and driving means for each of said cutting rolls adapted to engage and be driven by said platen driving means.

2. In a cutting machine of the class described, a platen roll with means for driving it, a carrier movable relative thereto, a plurality of idle cutting rolls provided with pinions and journaled in said carrier, and means for moving said carrier to bring any one of said cutting rolls into geared operative relation to said platen roll.

3. In a cutting machine of the class described, a platen roll, means associated therewith for moving it in a rectilinear path perpendicular to its axis in either direction, means for rotating said platen roll, and a carrier having a plurality of cutting rolls journaled therein, said carrier being movable to bring said rolls selectively into the plane of movement of said platen roll.

4. In a cutting machine of the class described, a platen roll, means for rotating the same, a rotatable carrier associated therewith, means for moving one of said elements towards and from the other, a plurality of cutting rolls journaled in said carrier concentric to the axis thereof, and means for rotating said carrier to bring any one of said cutting rolls into proximity to said platen roll.

5. In a cutting machine of the class described, a suitable frame, a platen roll journaled in bearings movable vertically of said frame, means for driving said platen roll, a carrier located above said platen roll, a plurality of cutting rolls journaled in said carrier, said carrier being movable to bring any one of said cutting rolls in vertical alignment with said platen roll, and means for imparting vertical movement to said platen roll to disengage it from or to engage it with said cutting roll.

6. In a cutting machine of the class described, a suitable main frame, a platen frame articulated thereto, a platen roll journaled in said platen frame, a cutter carrier movably supported by said frame, a plurality of cutting rolls journaled in said carrier, said carrier being movable to cause said cutting rolls to move in a path intersecting the path of movement of said platen roll, and means for rotating said platen roll, means for moving said articulated platen frame to position the platen in cooperative relation to the cutter roll or remove it therefrom.

7. In a cutting machine of the class described, a main frame, a drive shaft journaled therein, a platen frame pivotally mounted on said drive shaft, a platen roll journaled in said frame and having driving connections to said drive shaft, means for moving said platen frame to position the platen at or remove it from its point of work while maintaining operative said driving connections, a carrier movably supported from said main frame, a plurality of cutting rolls journaled in said carrier, and means for moving said carrier to cause said cutting rolls to move in a path intersecting the path of movement of said platen roll.

8. In a cutting machine of the class described, a main frame, a platen frame pivotally supported thereby, a platen roll journaled in said platen frame with means for driving it, cam means cooperating with said platen frame for raising and lowering its free end, a carrier movably mounted in said frame, a plurality of cutting rolls journaled in said carrier, said carrier being movable to cause said cutting rolls to move in a path intersecting the path of movement of the platen roll, and means for locking said carrier against movement when any given cutting roll is in operative position relative to the platen roll.

9. In a cutting machine of the class described, a main frame, a platen frame pivotally carried thereby, a platen roll journaled in the free portion of said frame with means for rotating it, a cutting roll frame pivotally mounted in said main frame to rotate about a fixed axis, a plurality of cutting rolls journaled in said cutting roll frame and arranged concentric to said fixed axis, and means for swinging said platen frame about its axis.

10. In a cutting machine of the class described, a main frame, a platen roll mounted therein for vertical bodily movement, means for effecting such movement in either direction, means for rotating said roll, a cutting roll carrier of turret form rotatably mounted in said frame above the platen roll to rotate about an axis parallel to the axis of the platen roll, and a plurality of cutting rolls journaled in said turret concentric to the axis thereof.

11. In a cutting machine of the class described, a main frame, a platen roll mounted therein for vertical bodily movement, means for effecting such movement in either direction, means for rotating said roll, a cutting roll carrier of turret form rotatably mounted in said frame above the platen roll to rotate about an axis parallel to the axis of the platen roll, a plurality of cutting rolls journaled in said turret concentric to the axis thereof, and a locking bolt slidably mounted in the main frame and engageable with any one of a plurality of locking recesses in the turret.

12. In a machine of the class described, a main frame, a platen roll frame mounted therein for vertical movement, a platen roll in said frame, means for rotating said roll, a pair of feed and delivery rolls journaled in said frame on opposite sides of the platen roll and driven therefrom, a cutter carrier supported by said main frame, and a plurality of cutting rolls carried thereby, said carrier being movable to bring any one of said cutting rolls into operative relation to said platen roll.

13. In a machine of the class described, a main frame, a platen roll frame mounted therein for vertical movement, a platen roll in said frame, means for rotating said roll, a pair of feed and delivery rolls journaled in said frame on opposite sides of the platen roll and driven therefrom, feed and delivery conveyor belts passing around said feed and delivery rolls and driven thereby, a cutter carrier supported by said main frame, and a plurality of cutting rolls carried thereby, said carrier being movable to bring any one of said cutting rolls into operative relation to said platen roll.

14. In a machine of the class described, a main frame, a platen roll frame mounted therein for vertical movement, means for rotating said roll, a pair of feed and delivery rolls journaled in said frame on opposite sides of the platen roll and driven therefrom, feed and delivery conveyor belts passing around said feed and delivery rolls and driven thereby, and a scrap stock return conveyor positioned to receive the scrap stock from the delivery conveyor belt.

15. In a machine of the class described, a main frame, a platen roll frame mounted therein for vertical movement, a platen roll in said frame, means for rotating said roll, a pair of feed and delivery rolls journaled in said frame on opposite sides of the platen roll and driven therefrom, said feed roller including in its drive a pawl and ratchet connection, feed and delivery conveyor belts passing around said feed and delivery rollers and driven thereby, idle rollers supporting said belts remote from the feed and delivery rolls, and means for rotating the idle roll of the feed belt by hand.

16. In combination in a machine for cutting blanks from unvulcanized sheet rubber, a platen roll, means for driving the same constantly, a plurality of cutting rolls to cut out various shapes from said sheet rubber, each of said rolls having a driving element individual thereto, a movable support for the cutting rolls to bring them individually into position to cut, each of said driving elements being operated by said platen driving means when its corresponding cutting roll and the platen are in cooperative relation, substantially as described.

17. In combination in a machine for cutting blanks from a sheet of unvulcanized rubber, a platen roll, a plurality of cutting rolls for cutting various shapes, a movable support for said cutter rolls for bringing them individually to cutting position, and means for positively rotating both the platen roll and the positioned cutting roll when their cooperative relation is established.

18. In combination in a machine for cutting blanks from a sheet of unvulcanized rubber, a platen roll, a plurality of cutting rolls, a movable support for the cutting rolls for bringing them individually to the point where cutting is done, a movable support for the platen roll, means for moving said platen support to bring the platen roll into cooperative relation with the cutting roll at said cutting point and means for positively driving both the platen roll and the cutting roll when they are in cooperative relation, substantially as described.

19. In combination in a machine for cutting blanks from a sheet of unvulcanized rubber, a platen roll, a plurality of cutting rolls, means associated with each cutting roll for driving it, a movable support for the cutting rolls whereby they are individually positioned at or removed from the cutting position and means common to all the cutting rolls to actuate their driving means individually when said rolls are brought individually into cooperative relation to the platen roll, substantially as described.

20. In combination in a machine for cutting blanks from a sheet of unvulcanized rubber, a plurality of cutting rolls, a driving pinion for each cutting roll, a carrier for said cutting rolls movable to selectively bring said cutting rolls individually to the cutting point, a platen roll, a gear associated therewith, means for driving said gear and platen roll, said platen roll being movable to and from said selected cutting roll at the cutting point, said gear meshing with the pinion of the cutting roll at the cutting point.

In testimony whereof, I affix my signature.

CHARLES W. STEELE.